United States Patent Office 3,480,568
Patented Nov. 25, 1969

3,480,568
POLYMERIZATION OF BENZENE IN THE PRESENCE OF OXYGEN AND CUPRIC AND ALUMINUM CHLORIDE
Roger L. Weichman, Orono, Maine, and John W. Walsh and William L. Fierce, Crystal Lake, Ill., assignors, by mesne assignments, to Union Oil Company of California, Los Angeles, Calif., a corporation of California
No Drawing. Filed Feb. 24, 1965, Ser. No. 435,061
Int. Cl. C08f 1/60, 1/72, 13/02
U.S. Cl. 260—2                                              9 Claims

ABSTRACT OF THE DISCLOSURE

The invention comprises the polymerization of benzene to p-polyphenyl by contacting benzene with a catalyst comprising mixed aluminum and cupric chlorides while introducing oxygen into contact with the catalyst to achieve a yield of polymer in excess of the theoretical oxidizing power of the catalyst.

The polymerization is performed at temperatures from 50°–200° C. The ratio of oxygen to cupric chloride employed is from about 10:1 to about 1:100 and the polymerization is performed over a period from 5 to 500 minutes. The resultant product is a solid useful as a moderator for nuclear reactors or for the fabrication of structural materials that are radiation, thermal and oxidation resistant.

DESCRIPTION OF THE INVENTION

This invention relates to improved methods of preparing p-polyphenyls and mixtures thereof.

As is disclosed in the copending U.S. application S.N. 345,946, now abandoned, of Roger L. Weichman and William L. Fierce, p-polyphenyls and polymers thereof are radiation resistant, resist thermal degradation and air oxidation at extremely high temperatures, and may be used as moderators for fission reactors and the fabrication of structural materials where such properties are advantageous.

The efficacy of polymerizing benzene through the anhydrous cupric chloride-aluminum chloride system has been set forth in the aforementioned application. However, it has now been discovered that even greater yields of p-polyphenyl are possible by making available to the system sufficient amounts of oxygen or oxygen containing gas at temperatures not less than about 50° C. Preferably, the oxygen is intimately contacted with the benzene-cupric chloride-aluminum chloride reaction mass by means of an oxygen bubbler tube terminating in the reaction mass and/or agitation of the reaction mass.

While reaction times and temperatures are not critical for the production of some polymer, it has been found that highest yields are obtained when the temperature of the reaction mass is maintained at reflux temperatures or temperatures that permit maintenance of the reaction mass in the liquid state. However, generally temperatures within the range of 50°–200° C. may be used with a sufficient pressure in the reaction mass vessel to maintain the reaction mass or mixture in the liquid phase. The time during which the reaction is carried out will vary depending upon the relative proportions of the reactants used but a range of about 5–500 minutes will generally be sufficient.

It is therefore an object of this invention to provide a method of preparing p-polyphenyl in higher yields than have heretofore been possible.

Another object of this invention is to provide an improvement in the method of preparing p-polyphenyls under substantially anhydrous conditions.

Still a further object of this invention is to provide a method of polymerizing benzene to p-polyphenyl under anhydrous conditions which consists in intimately contacting a reaction mass of benzene, cupric chloride and aluminum chloride with oxygen or an oxygen-containing gas at a temperature and pressure sufficient to maintain the reaction mass in the liquid state.

These and other objects will become apparent in view of the following commentary and disclosed specific embodiments of the invention.

Basically the general steps of the inventive process comprise intimately contacting a reaction mass consisting essentially of benzene, cupric chloride and aluminum chloride with a sufficient amount of oxygen to produce higher yields of p-polyphenyl than would be produced if the oxygen had not been added to the system. In order to effect as high a yield of the polymer as possible it is preferred that the reaction be carried out at temperatures not less than 50° C., desirably reflux temperature, and that the reaction mass be agitated or mechanically stirred so that the oxygen may readily dissolve in and contact the reaction mass throughout.

A series of experiments was run which comprised the same general procedure except where noted in the tabulation of data appearing hereafter. Anhydrous cupric chloride and anhydrous aluminum chloride were charged to a suitable flask equipped with condenser, thermometer, and stirrer. Oxygen at a low flow rate was passed into the flask and benzene was added. After addition of the benzene, the oxygen flow rate was increased to 100 or 200 cc./min. and the stirred mixture was brought up to the reaction temperature. In each experiment there was a strong evolution of hydrogen chloride gas which was allowed to escape from the reaction flask. At the end of each experiment the product mixture, which consisted of a black liquid and a black solid, was cooled to ambient temperature and poured over crushed ice. The resulting mixture was transferred to a separatory funnel with the aid of water and benzene to make the mixture easily handled. Filtering yielded a brown and black, sludge-like solid which was subjected to a washing procedure. This procedure consisted of the sequential, successive washing of the solid as follows:

(a) seven times with 50 ml. of acetone each time;
(b) three times with 50 ml. of a 1:1 solution of acetone and water each time; and
(c) one time with 50 ml. of acetone.

The final washed product was then dried from about 16 to 20 hours at a temperature of about 65°–70° C. in a drying oven. The product of Experiment 2 was further purified by washing repeatedly with (1) solutions of hot water and acetone, (2) 6 N HCl, (3) acetone, (4) solutions of water and acetone, and (5) acetone. The dried product exhibited no weight loss after this operation, indicating that the initial purification procedure was adequate.

Table I succinctly enumerates the results obtained in the various experiments. All of the dried products were chocolate brown solids whose infrared spectra corresponded to that known for p-polyphenyl.

TABLE I

| Experiment Number | 1a | 2 | 3 | 4b | 5 | 6c | 7 | 8 | 9 |
|---|---|---|---|---|---|---|---|---|---|
| Charge: | | | | | | | | | |
| Moles anhyd. $CuCl_2$ | 0.4 | 0.2 | 0.2 | 0.1 | 0.2 | 0.2 | 0.2 | 0.2 | 0.2 |
| Moles anhyd. $AlCl_3$ | 1.2 | 0.6 | 0.6 | 0.3 | 0.6 | 0.6 | 0.6 | 0.6 | 0.6 |
| Moles benzene | 5.0 | 2.5 | 2.5 | 2.5 | 2.5 | 2.5 | 2.5 | 2.5 | 2.5 |
| Total d moles $O_2$ charged | ~0.98 | ~0.98 | 0.31 | ~0.245 | 0.19 | 0.19 | 0.38 | 0.16 | 0.0 |
| Reaction conditions: | | | | | | | | | |
| Time (min.) at rxn. temp | 240 | 240 | 60 | 60 | 30 | 30 | 30 | 30 | 30 |
| Time (min.) required to reach rxn. temp | | | 16 | | 16 | 16 | 16 | 9 | 30 |
| Temp. (° C.); reflux=~78.5° C | Reflux | Reflux | Reflux | 40 | Reflux | Reflux | Reflux | 35–40 | Reflux |
| Oxygen flow (cc./min.) | 100 | 100 | 100 | 100 | 100 | 100 | 200 | 100 | 0 |
| p-Polyphenyl yield: | | | | | | | | | |
| Grams | 29.9 | 11.8 | 8.7 | 2.8 | 7.8 | 7.0 | 7.4 | 4.2 | 4.3 |
| Percent, based on $CuCl_2$ charged | 197.5 | 155.6 | 114.6 | 73.6 | 102.8 | 92.3 | 97.5 | 55.4 | 56.7 | a The method of contacting oxygen with the reaction mixture used in this run was more efficient than that used in the other runs. A paddle stirrer was situated above the end of a multiple-outlet oxygen bubbler tube. Also, the oxygen was preheated to about 70° C. before it entered the flask. Because double the usual amounts of $CuCl_2$, $AlCl_3$, and benzene were reacted, proportionately greater amounts of ice and solvents were used to work up the product.

b The solid product of this run was washed only with acetone and consequently contained some inorganic salts. Water washing would reduce somewhat the weight and yield of p-polyphenyl.

c This run is a repeat of experiment 5; it was conducted to determine whether the use of a different batch of $AlCl_3$ would affect the reaction. The difference in yields is not sufficient to affect any of our conclusions.

d Includes $O_2$ charged while bringing the reaction up to temperature.

It is readily apparent from comparing the results obtained in Experiments 2, 3 and 5 that the yield of p-polyphenyl decreases as the reaction time is shortened at constant temperature and oxygen flow. Ostensibly, long reaction times are not required to obtain p-polyphenyl yields in excess of 100%. From Experiments 5 and 7 it may be concluded that doubling the oxygen flow rate at reflux temperature has no significant effect on p-polyphenyl yield. Thus, the uptake of oxygen is incomplete at 100 cc./min. and a higher flow rate alone will not improve polymer yield.

That the yield of p-polyphenyl is increased by improving the efficiency with which oxygen and the reaction mixture are contacted is attested to by the comparison of the results of Experiments 1 and 2. The method of contacting oxygen with the reaction mass or mixture used in Experiment 1 is to be taken as illustrative, since other methods of improving contact efficiency would suffice equally as well. Note that a significant increase in yield was obtained in Experiment 1 wherein the amount of oxygen used was proportionately one half of that amount used in the other experiments.

It may be concluded that both oxygen and elevated temperatures, i.e., above about 50° C., are necessary to prepare p-polyphenyl in yields greater than 100% based on the amount of cupric chloride reacted in the system (see Experiments 5, 8, and 9). Essentially the same yields were obtained (a) at reflux temperature in the absence of oxygen, and
(b) at 35°–40° C. in the presence of oxygen.

A comparison of Experiments 5 and 9 conclusively shows that the presence of oxygen is necessary in the hereindisclosed invention. In addition, reaction times within the range of 5 to 500 minutes would appear to be adequate under most conditions.

While the reaction will proceed under a myriad of conditions, it is preferred that the temperature and pressure be such as to maintain the reaction mass or mixture of benzene, cupric chloride and aluminum chloride in the liquid phase or state. The molar proportions of reactants is not critical in a sense, since some p-polyphenyl will be produced under most conditions. However, to obtain the high yields of the polymer it is preferred to use substantially anhydrous reactants wherein there is an excess of benzene, thereby insuring efficient contact of the reactants. The preferred ratio of benzene to cupric chloride is in excess of 0.5. Additionally, extensive yields will be realized where the molar ratio of aluminum chloride to cupric chloride is about 3:1.

Even though only one method of providing the intimate contact between the oxygen and reaction mass has been disclosed, it is obvious that other means may be employed to effect the close contact and effective mixing. Various agitators, bubbler tubes, paddle stirrers, aerators, etc., will also serve equally as well, it being only important that as much of the liquid reaction mixture contact the introduced oxygen as completely and as quickly as the apparatus will permit. Generally, the molar ratio of oxygen to cupric chloride reacted, needed for high p-polyphenyl yield, will be within the range of 10:1 to 1:100 inclusive.

Thus, an efficient process for preparing p-polyphenyl polymers in high yields has been disclosed. It is to be understood that other methods of practicing the herein-disclosed invention may be practiced which methods will be within ordinary engineering skill, not departing from the spirit of the invention.

The embodiments of the invention in which an exclusive property or privilege is claimed are defined as follows:

1. In the method of polymerizing benzene to p-polyphenyl under substantially anhydrous conditions wherein anhydrous benzene is reacted with anhydrous cupric chloride in the presence of anhydrous aluminium chloride, the improvement which comprises maintaining the reaction mass temperature within the range of about 50°–200° C. and intimately contacting the reaction mass with oxygen to produce high yields of p-polyphenyl during the reaction period, the molar ratio of oxygen to cupric chloride being within tthe range of about 10:1 to 1:100.

2. The method according to claim 1 wherein the reaction period is about 5 to 500 minutes.

3. The method according to claim 2 wherein the molar ratio of aluminum chloride to cupric chloride is about 3 to 1 and the molar ratio of benzene to cupric chloride exceeds 0.5.

4. In the method of polymerizing benzene to p-polyphenyl under anhydrous conditions wherein benzene, anhydrous cupric chloride and a catalytic amount of anhydrous aluminum chloride form the reaction mass, the improvement which consists in agitating said reaction mass and intimately contacting said reaction mass with oxygen during the reaction period while maintaining the temperature of said reaction mass at the reflux temperature during said reaction period, the molar ratio of said oxygen to said cupric chloride being within the range of about 10:1 to 1:100.

5. The method according to claim 4 wherein said oxygen is introduced into said reaction mass at a rate of about 100–200 cc./min.

6. The method according to claim 5 wherein said reaction period is within the range of about 5 to 500 mintues inclusive.

7. The method according to claim 6 wherein said reflux temperature is about 78.5° C.

8. The method in accordance with claim 7 wherein said oxygen is heated prior to its contacting said reaction mass.

9. The method in accordance with claim 8 wherein the molar ratio of aluminum chloride to cupric chloride is about 3 to 1 and the molar ratio of benzene to cupric chloride exceeds 0.5.

References Cited

Badische Aniline & Soda Fabrik A.G., Dutch application No. 6,404,921, published Nov. 9, 1964.

Naarmann et al., German application No. 1,178,529, published Sept. 24, 1964.

SAMUEL H. BLECH, Primary Examiner